(12) United States Patent
Oh

(10) Patent No.: US 9,502,042 B2
(45) Date of Patent: Nov. 22, 2016

(54) APPARATUS FOR PROCESSING AN AUDIO SIGNAL AND METHOD THEREOF

(71) Applicant: LG ELECTRONICS INC., Seoul (KR)

(72) Inventor: Hyen-O Oh, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/719,567

(22) Filed: May 22, 2015

(65) Prior Publication Data

US 2015/0332684 A1 Nov. 19, 2015

Related U.S. Application Data

(63) Continuation of application No. 13/520,828, filed as application No. PCT/KR2011/000075 on Jan. 6, 2011, now Pat. No. 9,042,559.

(60) Provisional application No. 61/292,811, filed on Jan. 6, 2010, provisional application No. 61/296,873, filed on Jan. 20, 2010, provisional application No. 61/297,275, filed on Jan. 21, 2010.

(51) Int. Cl.
*H04R 5/00* (2006.01)
*G10L 19/00* (2013.01)
(Continued)

(52) U.S. Cl.
CPC .............. *G10L 19/00* (2013.01); *G10L 19/008* (2013.01); *G11B 27/034* (2013.01);
(Continued)

(58) Field of Classification Search
CPC ..... G10L 19/00; G10L 19/008; H04S 3/008; H04S 2400/01

USPC .............. 381/17, 22, 109; 704/503–504, 201
See application file for complete search history.

(56) References Cited

U.S. PATENT DOCUMENTS 7,783,051 B2 8/2010 Oh
7,881,817 B2 2/2011 Pang
(Continued)

FOREIGN PATENT DOCUMENTS

CN 1668124 A 9/2005
CN 101479787 A 7/2009
(Continued)

OTHER PUBLICATIONS

U.S. Office Action dated Sep. 10, 2015 for U.S. Appl. No. 13/520,811, 23 pages.
(Continued)

*Primary Examiner* — Disler Paul
(74) *Attorney, Agent, or Firm* — Fish & Richardson P.C.

(57) ABSTRACT

An apparatus for processing an audio signal and method thereof are disclosed. The present invention includes receiving a downmix signal and side information; extracting control restriction information from the side information; receiving control information for controlling gain or panning at least one object signal; generating at least one of first multi-channel information and first downmix processing information based on the control information and object information, without using the control restriction information; and, generating an output signal by applying the at least one of the first multichannel information and the first downmix processing information to the downmix signal, wherein the control restriction information relates to a parameter indicating limiting degree of the control information.

12 Claims, 15 Drawing Sheets

(51) Int. Cl.
  *G11B 27/034* (2006.01)
  *G11B 27/30* (2006.01)
  *G11B 27/34* (2006.01)
  *G10L 19/008* (2013.01)
  *H04S 3/00* (2006.01)

(52) U.S. Cl.
  CPC .......... *G11B 27/3027* (2013.01); *G11B 27/34* (2013.01); *H04S 3/008* (2013.01); *H04S 2400/01* (2013.01); *H04S 2400/11* (2013.01)

(56) References Cited

U.S. PATENT DOCUMENTS

| | | |
|---|---|---|
| 8,005,229 B2 | 8/2011 | Oh |
| 8,023,660 B2 | 9/2011 | Faller |
| 8,081,762 B2 | 12/2011 | Ojala |
| 8,175,295 B2 * | 5/2012 | Oh .......................... H04S 7/30 381/119 |
| 8,195,318 B2 | 6/2012 | Oh |
| 8,255,821 B2 * | 8/2012 | Oh ....................... G10L 19/008 381/119 |
| 8,296,158 B2 | 10/2012 | Kim |
| 8,311,227 B2 | 11/2012 | Oh |
| 8,340,325 B2 | 12/2012 | Oh |
| 8,355,509 B2 | 1/2013 | Faller |
| 8,359,113 B2 | 1/2013 | Oh |
| 8,379,868 B2 | 2/2013 | Goodwin |
| 8,463,605 B2 | 6/2013 | Oh |
| 8,483,410 B2 | 7/2013 | Park |
| 8,488,797 B2 | 7/2013 | Oh |
| 8,588,947 B2 | 11/2013 | Oh |
| 8,594,817 B2 * | 11/2013 | Oh ....................... G10L 19/008 381/119 |
| 8,625,808 B2 | 1/2014 | Kim |
| 8,687,829 B2 | 4/2014 | Hilpert |
| 8,712,058 B2 | 4/2014 | Jung |
| 8,756,066 B2 | 6/2014 | Kim |
| 2003/0236583 A1 | 12/2003 | Baumgarte |
| 2007/0071247 A1 | 3/2007 | Pang |
| 2007/0236858 A1 | 10/2007 | Disch |
| 2007/0280485 A1 | 12/2007 | Villemoes |
| 2008/0033732 A1 | 2/2008 | Seefeldt |
| 2008/0049943 A1 | 2/2008 | Faller |
| 2008/0097766 A1 | 4/2008 | Kim |
| 2008/0170711 A1 | 7/2008 | Breebaart |
| 2008/0192941 A1 | 8/2008 | Oh |
| 2008/0199026 A1 | 8/2008 | Oh |
| 2008/0205670 A1 | 8/2008 | Oh |
| 2008/0205671 A1 | 8/2008 | Oh |
| 2008/0228501 A1 | 9/2008 | Pang |
| 2008/0269929 A1 | 10/2008 | Oh |
| 2009/0051637 A1 | 2/2009 | Chen |
| 2009/0067634 A1 | 3/2009 | Oh |
| 2009/0125313 A1 | 5/2009 | Hellmuth |
| 2009/0125314 A1 | 5/2009 | Hellmuth |
| 2009/0164221 A1 | 6/2009 | Kim |
| 2009/0265164 A1 | 10/2009 | Yoon |
| 2009/0271015 A1 | 10/2009 | Oh |
| 2009/0287495 A1 | 11/2009 | Breebaart |
| 2010/0017195 A1 | 1/2010 | Villemoes |
| 2010/0046759 A1 | 2/2010 | Pang |
| 2010/0087938 A1 | 4/2010 | Oh |
| 2010/0092008 A1 | 4/2010 | Oh |
| 2010/0094631 A1 | 4/2010 | Engdegard |
| 2010/0119073 A1 | 5/2010 | Oh |
| 2010/0121647 A1 | 5/2010 | Beack |
| 2010/0135299 A1 | 6/2010 | Pang |
| 2010/0189266 A1 * | 7/2010 | Oh .......................... G10L 19/008 381/17 |
| 2010/0292994 A1 | 11/2010 | Lee |
| 2011/0013790 A1 | 1/2011 | Hilpert |
| 2011/0022402 A1 | 1/2011 | Engdegard |
| 2011/0112842 A1 | 5/2011 | Seo |
| 2011/0166867 A1 | 7/2011 | Seo |
| 2011/0261966 A1 | 10/2011 | Engdegard |
| 2012/0143613 A1 | 6/2012 | Herre et al. |
| 2012/0243690 A1 | 9/2012 | Engdegard |
| 2012/0314876 A1 | 12/2012 | Vilkamo et al. |
| 2013/0146313 A1 | 6/2013 | Jarrell |

FOREIGN PATENT DOCUMENTS

| | | |
|---|---|---|
| CN | 101490945 A | 7/2009 |
| EP | 0 206 3671 A2 | 5/2009 |
| KR | 10-2008-0035448 A | 4/2008 |
| KR | 10-2008-0089308 A | 10/2008 |
| KR | 10-2009-0057131 A | 6/2009 |
| WO | WO 2008/007653 A1 | 1/2008 |
| WO | WO 2008/046531 A1 | 4/2008 |
| WO | WO 2008/100067 A1 | 8/2008 |
| WO | WO 2008/114982 A1 | 9/2008 |
| WO | WO 2008/114984 A1 | 9/2008 |
| WO | WO 2008/120933 A1 | 10/2008 |
| WO | WO 2011/048067 A1 | 4/2011 |

OTHER PUBLICATIONS

US Final Office Action dated May 8, 2015 for U.S. Appl. No. 13/520,811, 23 pages.
International Search dated Sep. 27, 2011 for Application No. PCT/KR2011/000075, 3 pages.
Chinese Office Action dated Jul. 1, 2014 for Application No. 2011-80005568.7 with English Translation, 11 pages.
Chinese Office Action dated Jul. 2, 2014 for Application 2011-80005544.1, with English Translation, 11 pages.
U.S. Office Action dated Nov. 21, 2014 for U.S. Appl. No. 13/520,811, 17 pages.
European Search Report dated Mar. 25, 2015, for Application No. 11731919.4, 8 pages.
European Search Report dated Mar. 26, 2015 for Application No. 11731917, 9 pages.
JA 1/4 RGEN Herre et al: "Technical provisions for limiting perceptible distortions in SAOC", 90. MPEG Meeting; Oct. 26, 2009-Oct. 30, 2009; Xian; (Motion Picture Expert Group or ISO/IEC JTC1/SC29/WG11), No. M16975, Oct. 23, 2009, XP030045565, *the whole document*.
Anonymous: "Study on ISO/IEC FCD 23003-2:200x, Spatial Audio Object Coding", 90. MPEG Meeting; Oct. 26, 2009-Oct. 30, 2009; Xian; (Motion Picture Expertgroup or ISO/IEC JTC1/SC29/WG11), No. N11037, Dec. 7, 2009, XP030017534, ISSN:0000-0031, *Sections 4.2 and 61*.
Yan-Won Jung et al: "Proposal for including guideline information on the rendering parameters in SAOC", 87. MPEG Meeting; Feb. 2, 2009-Feb. 6, 2009; Lausanne; (Motion Picture Expert Group or ISO/IEC JTC1/SC29/WG11), No. M16105, Jan. 29, 2009, XP030044702, *the whole document*.
Leonid Terentien et al: "Clarifications regarding the enhanced Karaoke/Sole processing mode", 88. MPEG Eeting; Apr. 20, 2009-Apr. 24, 2009; Maui; (Motion Picture Expert Group or ISO/IEC JTC1/SC29/WG11), No. M16310, Apr. 17, 2009, XP030044907, * the whole document*.
U.S. Notice of Allowance dated Aug. 23, 2016 for U.S. Appl. No. 13/520,811, 14 pages.

* cited by examiner (A)

(B)

(A)

(B)

(A)

(B)

(A)

(B)

APPARATUS FOR PROCESSING AN AUDIO SIGNAL AND METHOD THEREOF

CROSS-REFERENCE TO RELATED APPLICATIONS

This application is a continuation of U.S. application Ser. No. 13/520,828, filed Jul. 6, 2012, now allowed, which is U.S. National Phase Application under 35 U.S.C. §371 of International Application PCT/KR2011/000075, filed on Jan. 6, 2011, which claims the benefit of U.S. Provisional Application No. 61/292,811, filed on Jan. 6, 2010, U.S. Provisional Application No. 61/296,873, filed on Jan. 20, 2010 and U.S. Provisional Application No. 61/297,275, filed on Jan. 21, 2010, the entire contents of each application is hereby incorporated by reference in its entirety.

TECHNICAL FIELD

The present invention relates to an apparatus for processing an audio signal and method thereof. Although the present invention is suitable for a wide scope of applications, it is particularly suitable for encoding or decoding an audio signal.

BACKGROUND ART

Generally, in the process for downmixing a plurality of objects into a mono or stereo signal, parameters are extracted from the object signals, respectively. These parameters are usable for a decoder. And, a panning and gain of each of the objects are controllable via a selection made by a user.

DISCLOSURE OF THE INVENTION

Technical Problem

However, in order to control each object signal, each source included in a downmix needs to be appropriately positioned or panned.

Moreover, an object parameter needs to be flexible converted to a multichannel parameter for upmixing to provide a downward compatibility by a channel-oriented decoding scheme.

Technical Solution

Accordingly, the present invention is directed to an apparatus for processing an audio signal and method thereof that substantially obviate one or more of the problems due to limitations and disadvantages of the related art.

An object of the present invention is to provide an apparatus for processing an audio signal and method thereof, by which a gain or panning of an object is controlled to output a mono signal a stereo signal or a multichannel signal.

Another object of the present invention is to provide an apparatus for processing an audio signal and method thereof, by which a distortion generated from suppressing or boosting a gain or panning of a specific object excessively can be controlled when a user adjusts a gain or panning of an object.

Another object of the present invention is to provide an apparatus for processing an audio signal and method thereof, by which a distortion attributed to an excessive rendering in excessively suppressing a specific object in a karaoke mode, a solo mode or the like can be controlled in a manner different from that controlling a distortion of a regular object.

Another object of the present invention is to provide an apparatus for processing an audio signal and method thereof, by which a modified rendering result can be outputted via an interface to be recognized by a user in modifying a control to prevent a distortion due to a user's control.

A further object of the present invention is to provide an apparatus for processing an audio signal and method thereof, by which a control for preventing a distortion can be disabled in accordance with a user's intention.

Advantageous Effects

Accordingly, the present invention provides the following effects or advantages.

First of all, in controlling a gain and panning of an object, the present invention restricts excessive rendering, thereby enhancing a sound quality.

Secondly, when an object signal needs to be excessively controlled in case of a karaoke mode or a solo mode, the present invention is able to efficiently perform a restriction on a control using a separate control restriction information.

Thirdly, in case of putting a restriction on a control inputted by a user, the present invention output the restricted control via an interface, thereby performing the control more efficiently by informing a user that the user-specific control is modified or changed.

Fourthly, in case that a user attempts to apply 100% of a user's control irrespective of a presence or non-presence of a degradation of a sound quality, the present invention turns of a control for distortion prevention and skips a control restriction information, thereby enabling the user to perform a user-specific rendering.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

BEST MODE

Figure 1:
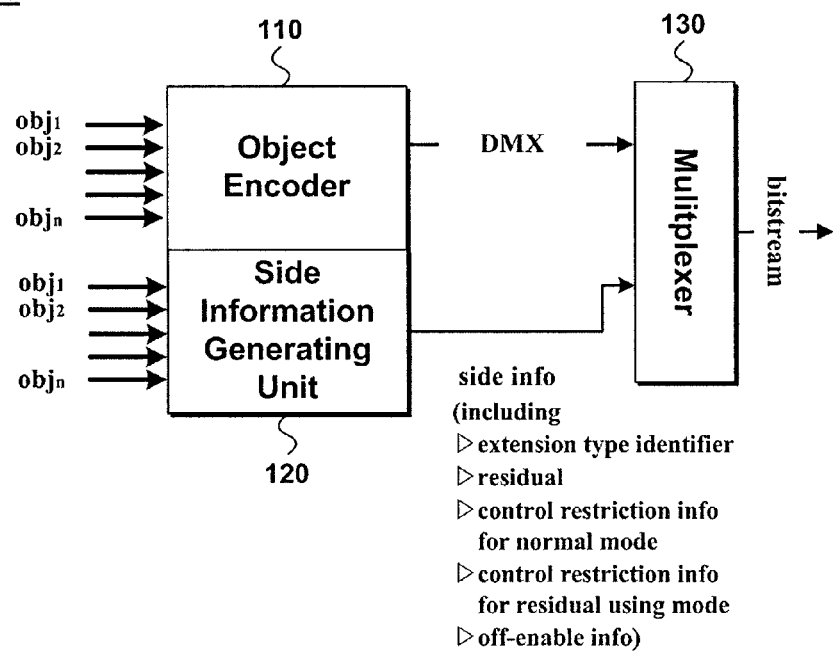
FIG. 1 is a block diagram of a configuration of an audio signal processing apparatus according to an embodiment of the present invention.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method for processing an audio signal, comprising: receiving a downmix signal and side information; extracting extension type identifier indicating whether extension area includes a residual signal from the side information; when the extension type identifier indicates that the extension area includes the residual signal, extracting control restriction information for residual using mode from the side information; receiving control information for controlling gain or panning of at least one object signal; estimating modified control information based on the control information and the control restriction information; obtaining at least one of enhanced object signal and one or more regular object signals from the downmix signal using the residual signal; and, generating an output signal using the modified control information and at least one of enhanced object signal and one or more regular object signal, wherein the control restriction information for residual using mode relates to a parameter indicating limiting degree of the control information in case of the residual using mode is provided.

According to the present invention, the generating of the output signal comprises: generating downmix processing information based on the modified control information and object information; and, generating the output signal by applying the modified control information to at least one of the enhanced object signal and one or more regular object signals.

According to the present invention, a number of channels of the output signal is equal to a number of channels of the downmix signal.

According to the present invention, the at least one object signal includes the enhanced object signal and one or more regular object signals.

According to the present invention, the control information comprises one parameter for controlling gain of the entire one or more regular object signals.

According to the present invention, when the extension type identifier indicates that the extension area includes the residual signal, the control information includes mode selecting information indicating one of karaoke mode and solo mode.

To further achieve these and other advantages and in accordance with the purpose of the present invention, an apparatus for processing an audio signal, comprising: a demultiplexer receiving a downmix signal and side information; an extracting unit extracting extension type identifier indicating whether extension area includes a residual signal from the side information, and when the extension type identifier indicates that the extension area includes the residual signal, extracting control restriction information for residual using mode from the side information; a control restricting unit receiving control information for controlling gain or panning of at least one object signal, and estimating modified control information based on the control information and the control restriction information; a residual processing unit obtaining at least one of enhanced object signal and one or more regular object signals from the downmix signal using the residual signal; and, an object decoder generating an output signal using the modified control information and at least one of enhanced object signal and one or more regular object signal, wherein the control restriction information for residual using mode relates to a parameter indicating limiting degree of the control information in case of the residual using mode is provided.

According to the present invention, the object decoder comprises: an information generating unit generating downmix processing information based on the modified control information and object information; and, a downmix processing unit generating the output signal by applying the modified control information to at least one of the enhanced object signal and one or more regular object signals.

According to the present invention, a number of channels of the output signal is equal to a number of channels of the downmix signal.

According to the present invention, the at least one object signal includes the enhanced object signal and one or more regular object signals.

According to the present invention, the control information comprises one parameter for controlling gain of the entire one or more regular object signals.

According to the present invention, when the extension type identifier indicates that the extension area includes the residual signal, the control information includes mode selecting information indicating one of karaoke mode and solo mode.

To further achieve these and other advantages and in accordance with the purpose of the present invention, a method for processing an audio signal, comprising: receiving a downmix signal and side information; extracting control restriction information from the side information; receiving control information for controlling gain or panning at least one object signal; generating at least one of first multi-channel information and first downmix processing information based on the control information and object information, without using the control restriction information; and, generating an output signal by applying the at least one of the first multichannel information and the first downmix processing information to the downmix signal, wherein the control restriction information relates to a parameter indicating limiting degree of the control information is provided.

According to the present invention, the method farther comprises extracting off-enable information from the side information, wherein the off-enable information indicates whether the control restriction information must be used or may be used selectively.

According to the present invention, when the off-enable information indicates that the control restriction information may be used selectively, the first multi-channel information and the first downmix processing information are generated, without using the control restriction information.

According to the present invention, when the off-enable information indicates that the control restriction information must be used, estimating modified control information based on the control information and the control restriction information.

According to the present invention, the method further comprises generating at least one of second multichannel information and second dowmnix processing information based on the modified control information, object information and the control restriction information.

According to the present invention, when the output signal corresponds to multichannel signal, the second multichannel information is generated, when the output signal corresponds to mono signal or stereo signal, the second multichannel information is not generated.

According to the present invention, when the output signal corresponds to multichannel signal, the first multichannel information is generated.

when the output signal corresponds to mono signal or stereo signal, the first multichannel information is not generated.

To further achieve these and other advantages and in accordance with the purpose of the present invention, an apparatus for processing an audio signal, comprising: a demultiplexer receiving a downmix signal and side information; an extracting unit extracting control restriction information from the side information; a control restricting unit receiving control information for controlling gain or panning at least one object signal; an information generating unit generating at least one of first multi-channel information and first downmix processing information based on the control information and object information, without using the control restriction information; and, an output channel generating unit generating an output signal by applying the at least one of the first multichannel information and the first downmix processing information to the downmix signal, wherein the control restriction information relates to a parameter indicating limiting degree of the control information.

According to the present invention, the extracting unit further extracts off-enable information from the side information, wherein the off-enable information indicates whether the control restriction information must be used or may be used selectively.

According to the present invention, when the off-enable information indicates that the control restriction information may be used selectively, the first multi-channel information and the first downmix processing information are generated, without using the control restriction information.

According to the present invention, when the off-enable information indicates that the control restriction information must be used, the control restricting unit estimates modified control information based on the control information and the control restriction information.

According to the present invention, the information generating unit generates at least one of second multichannel information and second downmix processing information based on the modified control information, object information and the control restriction information.

According to the present invention, when the output signal corresponds to multichannel signal, the second multichannel information is generated, when the output signal corresponds to mono signal or stereo signal, the second multichannel information is not generated.

According to the present invention, when the output signal corresponds to multichannel signal, the first multichannel information is generated, when the output signal corresponds to mono signal or stereo signal, the first multichannel information is not generated.

It is to be understood that both the foregoing general description and the following detailed description are exemplary and explanatory and are intended to provide further explanation of the invention as claimed.

MODE FOR INVENTION

Reference will now be made in detail to the preferred embodiments of the present invention, examples of which are illustrated hi the accompanying drawings. First of all, terminologies or words used in this specification and claims are not construed as limited to the general or dictionary meanings and should be construed as the meanings and concepts matching the technical idea of the present invention based on the principle that an inventor is able to appropriately define the concepts of the terminologies to describe the inventor's invention in best way. The embodiment disclosed in this disclosure and configurations shown in the accompanying drawings are just one preferred embodiment and do not represent all technical idea of the present invention. Therefore, it is understood that the present invention covers the modifications and variations of this invention provided they come within the scope of the appended claims and their equivalents at the timing point of filing this application.

According to the present invention, terminologies not disclosed in this specification can be construed as the following meanings and concepts matching the technical idea of the present invention. Specifically, 'coding' can be construed as 'encoding' or 'decoding' selectively and 'information' in this disclosure is the terminology that generally includes values, parameters, coefficients, elements and the like and its meaning can be construed as different occasionally, by which the present invention is non-limited.

FIG. 1 is a block diagram of a configuration of an audio signal processing apparatus according to an embodiment of the present invention.

Referring to FIG. 1, an encoder 100 includes an object encoder 110 and a side information generating unit 120 and is able to further include a multiplexer 130.

The object encoder 110 generates a downmix signal DMX of a mono or stereo channel by downmixing at least one or more object signals. In this case, the at least one or more object signals include at least one enhanced object signal (EAO) as well as at least one regular object signal. For instance, an enhanced object corresponds to an accompanied music in a song and a regular object can correspond to a vocal. In case of a karaoke mode, the enhanced object remains while the regular object is suppressed. In case of a solo mode, the regular object remains while the enhanced object is suppressed.

The side information generating unit 120 generates a side information on the at least one object signal in a following manner. First of all, in the process for downmixing the at least one object signal into a downmix signal DMX, the side information generating unit 120 generates object information. In this case, the object information (OI) is the information on objects included in the downmix signal and is also the information necessary to generate a plurality of object signals from the downmix signal (DMX). In particular, the object information can include object level information, object correlation information and the like, by which the present invention is non-limited. Moreover, downmix gain information (DMG: DownMix Gain) and downmix channel level difference (DCLD) can be further included in the object information. In this case, the downmix gain information (DMG) indicates a gain applied to each object before the corresponding object is downmixed. And, the downmix channel level difference (DCLD) indicates a ratio of each object applied to a left channel to the corresponding object applied to a right channel if a downmix signal is a stereo signal.

And, the side information generating unit 120 generates an extension type identifier, a residual signal, control restriction information of a normal mode, control restriction information of a residual using mode, and off-enable information. In this case, the control restriction mode (of the normal mode or the residual using mode) corresponds to the information for restricting control information determined by a user input for sound quality enhancement. Such information as the extension type identifier and the like shall be described in detail together with a decoding device later.

The multiplexer 130 generates at least one bitstream by multiplexing the side information including the object information, the extension type identifier and the like with the downmix (DMX).

Figure 2:
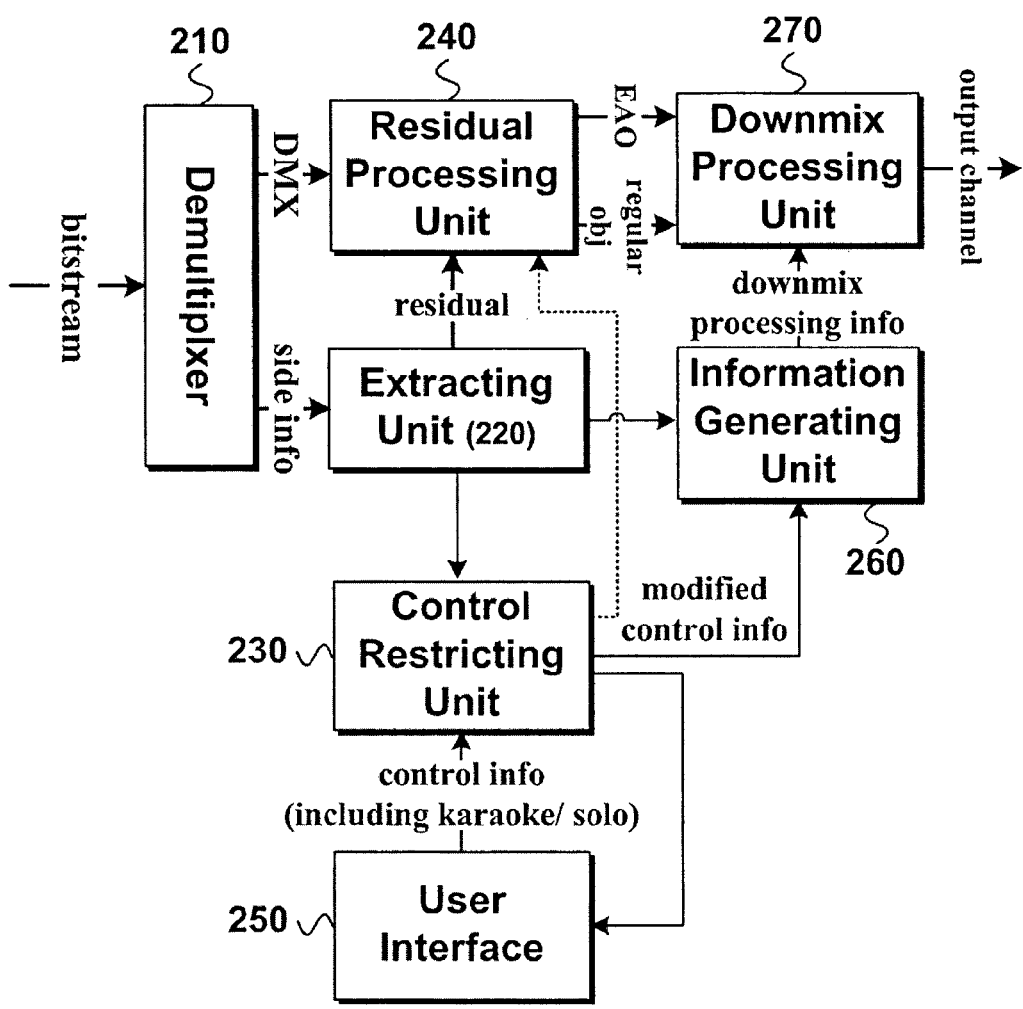
FIG. 2 is a block diagram of a configuration of a decoder in an audio signal processing apparatus according to a first embodiment of the present invention.

FIG. 2 is a block diagram of a configuration of a decoder in an audio signal processing apparatus according to a first embodiment of the present invention.

Referring to FIG. 2, a decoder 200 according to a first embodiment of the present invention includes an extracting unit 220 and a control restricting unit 230 and is able to farther include a demultiplexer 210, a residual processing unit 240, a user interface 250, an information generating unit 260 and a downmix processing unit 270. Optionally, the decoder 200 is able to further include a multichannel generating unit (not shown in the drawing). Moreover, both of the downmix processing unit 270 and the information generating unit 260 can be named as an object decoder (not shown in the drawing).

The demultiplexer 210 extracts a downmix signal DMX and side information from at least one received bitstream. As mentioned in the foregoing description of the encoder, the downmix signal is a signal generated from downmixing at least one or more object signals and can include a mono or stereo signal. In this case, the at least one object signal can include an enhanced object as well as a regular object.

The extracting unit 220 extracts object information from the side information. If a residual signal exists in the side information, the extracting unit 220 extracts the residual signal. Moreover, the extracting unit 220 is able to extract an extension type identifier, control restriction information for a residual using mode, of which details shall be explained with reference to FIG. 3 later. The residual signal is delivered to the residual processing unit 240. The object information is delivered to the information generating unit 260 or can be delivered to the control restricting unit 230 if necessary.

The control restricting unit 230 receives control information from the user interface 250 and the like, modifies the received control signal, and then outputs the modified control information. In this case, the control information is provided to control a gain or panning of an object for at least one object included in the downmix signal. Meanwhile, if the control information has a matrix type, it can be represented as the following formula.

$$M_{ren} = \begin{bmatrix} m_{0,Lf} & m_{1,Lf} & m_{2,Lf} & \cdots & m_{N-1,Lf} \\ m_{0,Rf} & m_{1,Rf} & m_{2,Rf} & \cdots & m_{N-1,Rf} \\ m_{0,C} & m_{1,C} & m_{2,C} & \cdots & m_{N-1,C} \\ m_{0,Lfe} & m_{1,Lfe} & m_{2,Lfe} & \cdots & m_{N-1,Lfe} \\ m_{0,Ls} & m_{1,Ls} & m_{2,Ls} & \cdots & m_{N-1,Ls} \\ m_{0,Rs} & m_{1,Rs} & m_{2,Rs} & \cdots & m_{N-1,Rs} \end{bmatrix} \quad \text{[Formula 1]}$$

In Formula 1, N indicates the total number of objects. And, Lf, Rf, C, Lfe, Ls and Rs indicate a multichannel (i.e., left front channel, right front channel, center channel, low frequency channel, left surround channel and right surround channel).

If the enhanced object is included in the downmix signal and the side information is included in the residual signal, the control information can include mode selection information for the residual using mode (e.g., karaoke mode, solo mode, etc.).

Meanwhile, the control restricting unit 230 is able to use an object signal (particularly, downmix gain information (DMG), control restriction information and/or the like to modify or transform the control information, which shall be described in detail with reference to FIG. 4 and FIG. 5 later. The control restricting unit 230 delivers the modified control information to the information generating unit 260 or to the user interface 250. In case that the modified control information includes a control on the enhanced object, it can be delivered to the residual processing unit 240 as well.

The user interface 250 receives a command for a user-specific object control. If a residual is included in a downmix signal and a residual using mode (e.g., karaoke mode, solo mode, etc.) is available, it is able to provide a separate screen for the control on the enhanced object in the residual using mode, which shall be described with reference to FIG. 6 later. Besides, it is able to output the modified control information received from the control restricting unit 230, which shall be described with reference to FIG. 7 later.

In case of receiving the residual signal from the extracting unit 220, the residual processing unit 240 extracts the enhanced object (EAO) and/or the at least one regular object from the downmix signal DMX using the received residual signal. In this case, the residual signal may include the signal generated in the course of downmixing the enhanced object and the regular objects in the encoder or can include the signal necessary to extract the enhanced object or the at least one regular object from the downmix signal DMX. Meanwhile, in the process for extracting the enhanced object (EAO), object information including an object level difference and the like can be further used as well as the residual signal.

Afterwards, if the control on the enhanced object (EAO) is included in the control information, the residual processing unit 240 performs the control on the enhanced object based on the modified control information. Subsequently, the residual processing unit 240 delivers the at least one regular object and the enhanced object (EAO) to the downmix processing unit 270.

The information generating unit 260 generates downmix processing information using the object information received from the extracting unit 220 and the modified control information received from the control restricting unit 230. In this case, the downmix processing information is the information applied to the enhanced object and/or the regular object to generate a processed downmix signal. If a multichannel output is necessary, the information generating unit 260 is able to further generate multichannel information using the object information and the modified control information. In this case, the multichannel information is the information used to generate a multichannel by upmixing the downmix signal and is able to include such a spatial parameter as a channel level difference (CLD) and the like. In particular, the multichannel information includes frame information (Frameinfo ( )), OTT information (OttData ( )), and the like. The frame information (Frameinfo ( )) can include the number of parameter sets and frame information indicating the parameter set is applied to which time slot. And, the OTT information can include such a parameter necessary for an OTT (one-to-two) box as a channel level difference (CLD), a channel correlation information (ICC) and the like.

Yet, if there exists a condition that the number of channels of a downmix signal should be equal to that of an output signal among conditions of the residual using mode, the information generating unit 260 does not generate the multichannel information but does the downmix processing information only. On this condition, the control information received by the control restricting unit 230 can have a specialized configuration by schematizing Formula 1 into a stereo or mono channel instead of the multichannel.

The downmix processing unit 270 outputs a processed downmix signal by processing the enhanced object and/or the regular object using the downmix processing information. If the above-mentioned condition exists, the downmix processing unit 270 outputs the processed downmix signal (i.e., the processed enhanced object and/or the processes regular object) as an output signal of a time domain.

Figure 3:
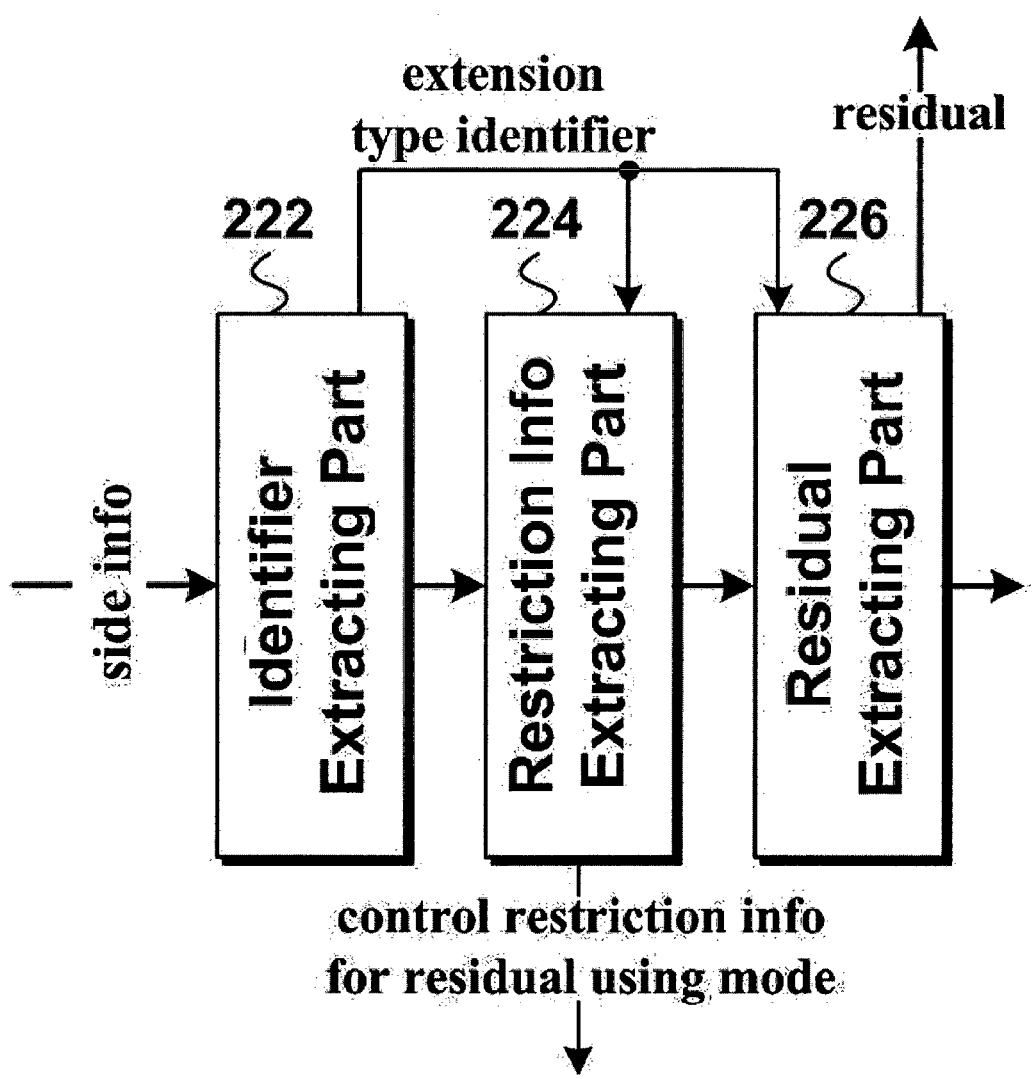
FIG. 3 is a detailed block diagram of a configuration of an extracting unit 220 shown in FIG. 2 according to an embodiment of the present invention.

FIG. 3 is a detailed block diagram of a configuration of the extracting unit 220 shown in FIG. 2 according to an embodiment of the present invention.

Referring to FIG. 3, the extracting unit 220 can include an identifier extracting part 222, a restriction information extracting part 224 and a residual extracting part 226.

The identifier extracting part 222 extracts an extension type identifier from side information. In this case, the extension type identifier includes an identifier indicting whether an extension area of the side information includes a residual signal. And, the extracted extension type identifier is delivered to the restriction information extracting part 224.

If the extension type identifier indicates that the extension area includes the residual signal, the restriction information extracting part 224 extracts control restriction information for the residual using mode from the side information.

In this case, the control restriction information is the information putting restriction on the control information inputted by a user through the user interface 250 in order to prevent a sound quality from being distorted or degraded. Since at least one or more objects downmixed into a downmix signal have correlation, if a specific object is excessively suppressed or boosted, it may cause a problem that a sound quality can be degraded. If a user attempt to perform an extreme rendering, the control restriction information plays a role in putting restriction enough not to considerably distort the sound quality. The control restriction information is associated with a parameter that indicates a limiting degree for the control information.

Meanwhile, the control restriction information for the residual using mode means the control restriction information suitable for the residual using mode (e.g., karaoke mode, solo mode, etc.). For instance, the karaoke or solo mode is the mode for performing an extreme rendering of suppressing all objects except a background music or suppressing all objects except a vocal. Therefore, if the control restriction information of a normal mode is applied as it is, the original purpose of the karaoke or solo mode may not be encouraged. For instance, a vocal component remains in the karaoke mode or a background music component may be mixed in the solo mode. Hence, if a residual signal is received for an extreme rendering, control restriction information suitable for a residual using mode is separately received. The control restriction information of the residual using mode is delivered to the former control restricting unit 230 described with reference to FIG. 2.

If the extension type identifier indicates that the extension area includes the residual signal, the residual extracting part 226 extracts the residual signal from the side information and then delivers the residual signal to the former residual processing unit 240 described with reference to FIG. 2.

Figure 4:
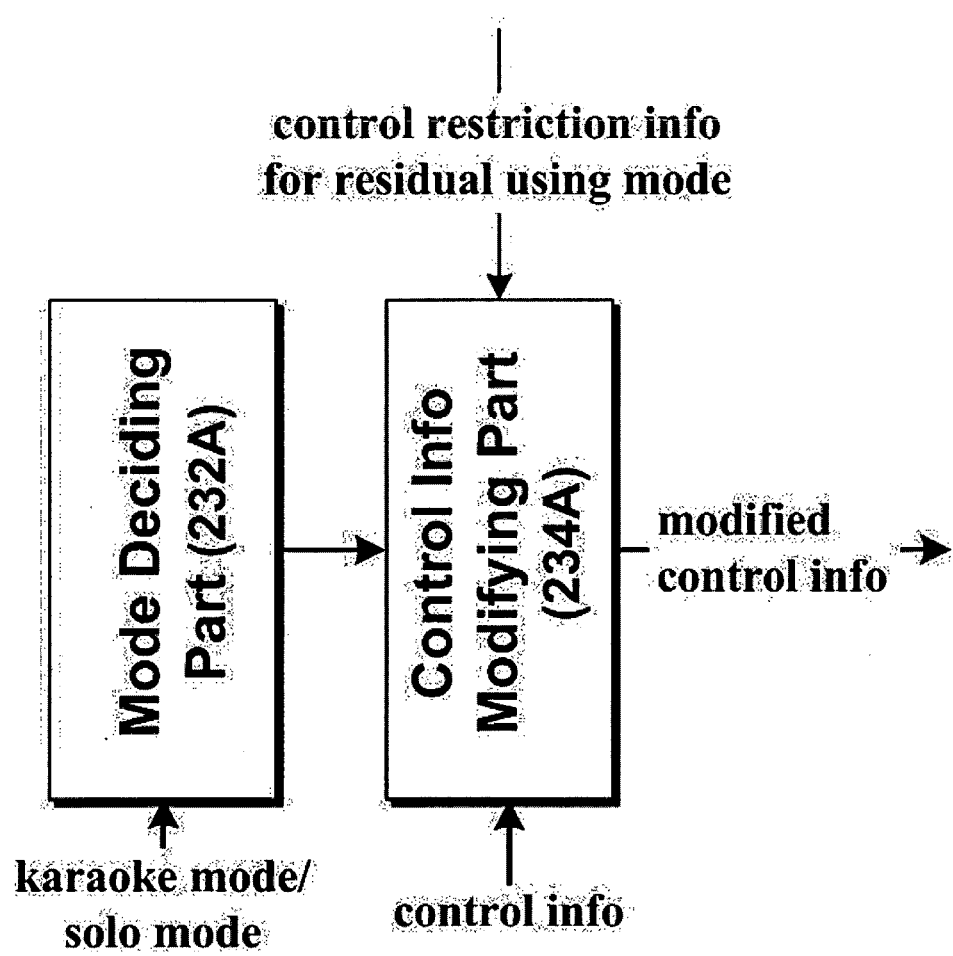
FIG. 4 is a detailed block diagram of a configuration of a control restricting unit 230 shown in FIG. 2 according to a first embodiment 230A.

FIG. 4 is a detailed block diagram of a configuration of a control restricting unit 230 shown in FIG. 2 according to a first embodiment 230A. And, FIG. 5 is a detailed block diagram of a configuration of a control restricting unit 230 shown in FIG. 2 according to a second embodiment 230B. In particular, in case of a residual using mode, the control restricting unit 230A according to a first embodiment modifies control information using separate control restriction information for an enhanced object. In case of a residual using mode, the control restricting unit 230B according to a second embodiment modifies control information by restricting a control on a regular object except an enhanced object.

Referring to FIG. 4, the control restricting unit 230A includes a mode deciding part 232A and a control information modifying part 234A.

The mode deciding part 232A is the part configured to decide a presence or non-presence of a residual using mode (e.g., karaoke mode and/or solo mode). The presence or non-presence of the residual using mode can be decided in a manner of interpreting data inputted by a user to control a gain and/or panning or can be decided based on whether a separate input for selecting a karaoke mode or a solo mode is received. In the latter case, if control information is inputted via a separate karaoke tap shown in FIG. 6 or FIG. 7, the inputted control information can be regarded as an input for selecting a karaoke mode or a solo mode.

If an enhanced object is included in a downmix, the mode deciding part 232A is able to determine which one of a plurality of objects included in the downmix is the enhanced object as well as determines the presence or non-presence of the residual using mode.

If the presence of the residual using mode is decided, the control information modifying part 234A modifies the control information using the control restriction information for the residual using mode and then outputs the modified control information. The control restriction information for the residual using mode is associated with a parameter indicating a limiting degree of the control information in case of the residual using mode. For instance, since an extreme rendering is generally allowed for the residual using mode, a value of the parameter indicating the limiting degree can be smaller than a parameter value of a normal mode.

On the contrary, if the non-presence of the residual using mode is decided, the control information modifying part 234A is able to modify the control information using the control restriction information for the normal mode.

Figure 6:
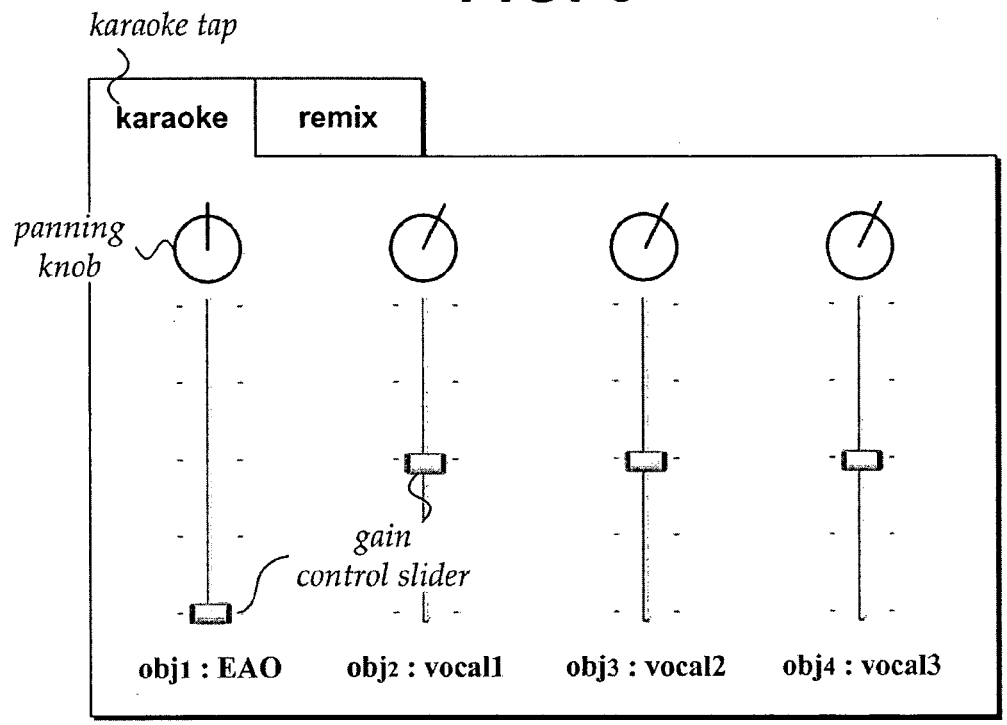
FIG. 6 is a diagram for one example of screen configuration of a user interface 250 shown in FIG. 2.
Figure 6:
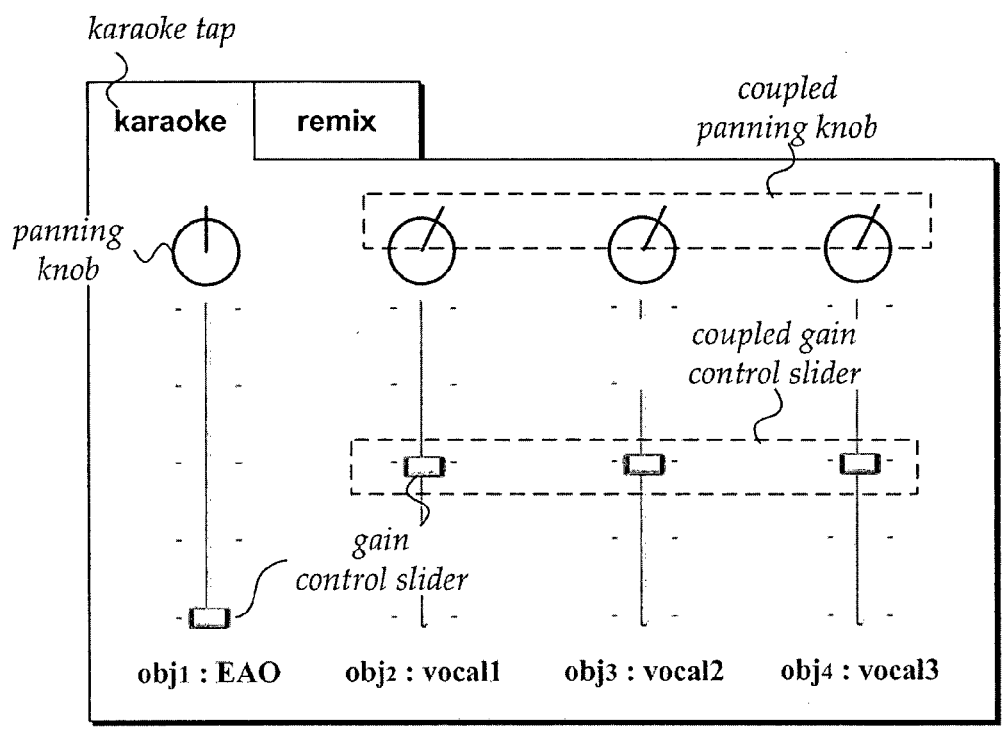

Meanwhile, if a condition that regular objects are controllable as one in the residual using mode instead of being controlled individually is added, the control information received by the control information modifying part 234A can include the information interoperable among regular objects except an enhanced object. For instance, via such a screen as shown in FIG. 6 (B), the interoperable control information can be generated based on the information inputted via coupled panning knobs or coupled gain control sliders.

Thus, the control restricting unit 230A according to the first embodiment receives the control restriction information for the residual using mode. In case of the residual using mode, the control restricting unit 230A modifies control information on the objects including the enhanced object using the received control restriction information.

Figure 5:
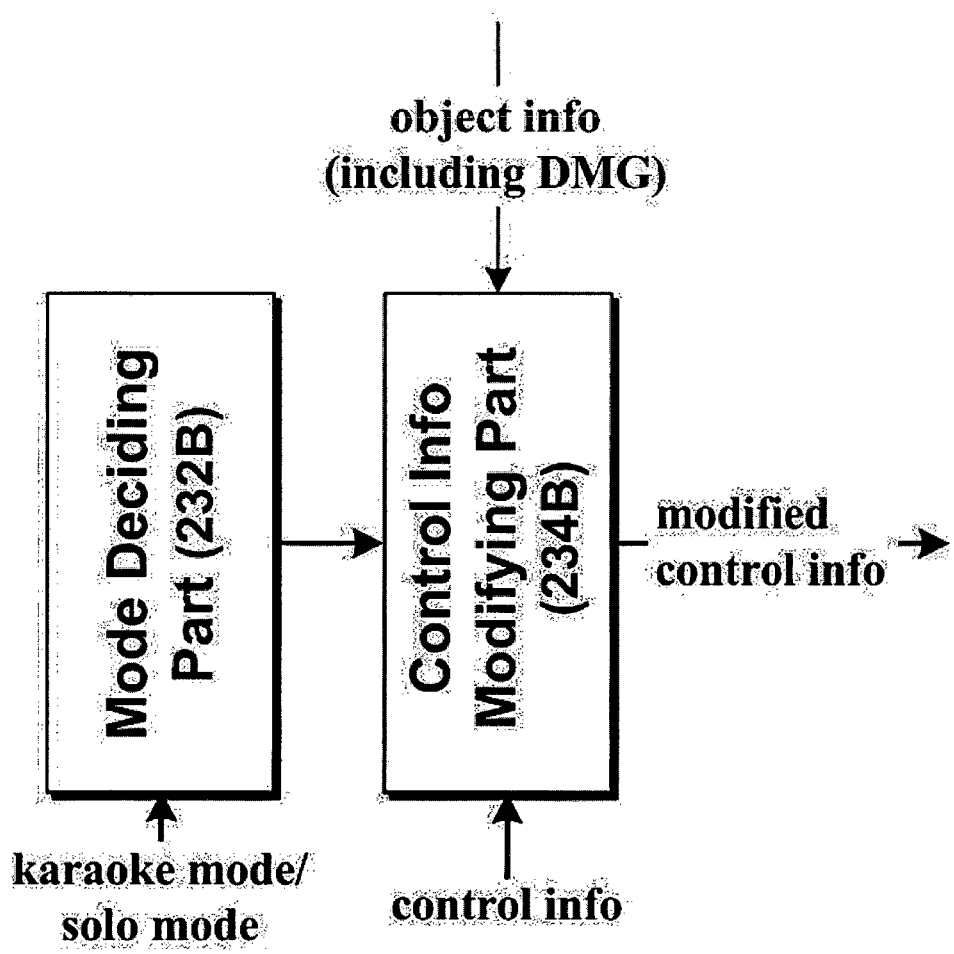
FIG. 5 is a detailed block diagram of a configuration of a control restricting unit 230 shown in FIG. 2 according to a second embodiment 230B.

Referring to FIG. 5, a control restricting unit 230B according to a second embodiment includes a mode deciding part 232B and a control information modifying part 234B. Since the mode deciding part 232B performs a function almost similar to that of the former mode deciding part 232A of the first embodiment, its description shall be omitted.

Unlike the former control restricting unit 230B according to the first embodiment, in case of a residual using mode, the control information modifying part 234B does not modify control information for an enhanced object but modifies control information on a regular object. In this case, control restriction information used for the modification can be received or self-generated. And, the control restriction information may be free from the condition that regular objects are controlled at a time.

The control information on the enhanced object is not modified but the control information on the regular object is modified. Thus, one example of the modified control information ($M_{ren,limited}$) is represented as Formula 2 and Formula 3.

$$M_{ren,limited} = \begin{bmatrix} \hat{m}_{0,Lf} \hat{m}_{1,Lf} & \hat{m}_{2,Lf} \cdots \hat{m}_{N-1,Lf} \\ \hat{m}_{0,Rf} \hat{m}_{1,Rf} & \hat{m}_{2,Rf} \cdots \hat{m}_{N-1,Rf} \\ \hat{m}_{0,C} \hat{m}_{1,C} & \hat{m}_{2,C} \cdots \hat{m}_{N-1,C} \\ \hat{m}_{0,Lfe} \hat{m}_{1,Lfe} & \hat{m}_{2,Lfe} \cdots \hat{m}_{N-1,Lfe} \\ \hat{m}_{0,Ls} \hat{m}_{1,Ls} & \hat{m}_{2,Ls} \cdots \hat{m}_{N-1,Ls} \\ \hat{m}_{0,Rs} \hat{m}_{1,Rs} & \hat{m}_{2,Rs} \cdots \hat{m}_{N-1,Rs} \\ \text{unmodified} & \text{modified} \end{bmatrix}$$ [Formula 2]

In Formula 2, N indicates the total number of objects. Lf, Rf, C, Lfe, Ls and Rs indicate a multichannel (i.e., left front channel, right front channel, center channel, low frequency channel, left surround channel and right surround channel). $M_{ren,limited}$ indicates a modified control information.

In Formula 2, enhanced objects include a first object and a second object (j=0, 1).

$$M_{ren,limited} = I_{EAO}M_{ren} + (I - I_{EAO})M_{ren,limited\_temp}$$ [Formula 3]

In Formula 3, $M_{ren}$ indicates a received control information [cf Formula 1].

When the total object number is N, an index of an enhanced object is j, and N×N indicates a diagonal matrix, $I_{EAO}$ indicates a matrix having $j^{th}$ diagonal element set to 1 and the rest of elements set to 0, i.e., an element that passes a column corresponding to the enhanced object.

$M_{ren,limited\_temp}$ indicates modified control information, which is modified using control restriction information of a normal mode, on regular objects.

Meanwhile, the control restriction information of the normal mode, which is used to modify the control information on the regular object, is received via a bitstream or can be generated via downmix gain information (DMG) in object information. As mentioned in the foregoing description, the downmix gain information includes a gain indicating an extent of each object included in a downmix (DMX). Hence, when a user controls a gain or palming of an object based on the downmix gain information, it is able to determine what degree of limitation will be put (i.e., a limiting degree).

In the foregoing description, the decoder according to the first embodiment is described with reference to FIG. 2, the detailed configuration of the extracting unit 220 is examined with reference to FIG. 3, and the two kinds of embodiments of the control restricting unit 230 are explained with reference to FIG. 4 and FIG. 5.

Figure 7:
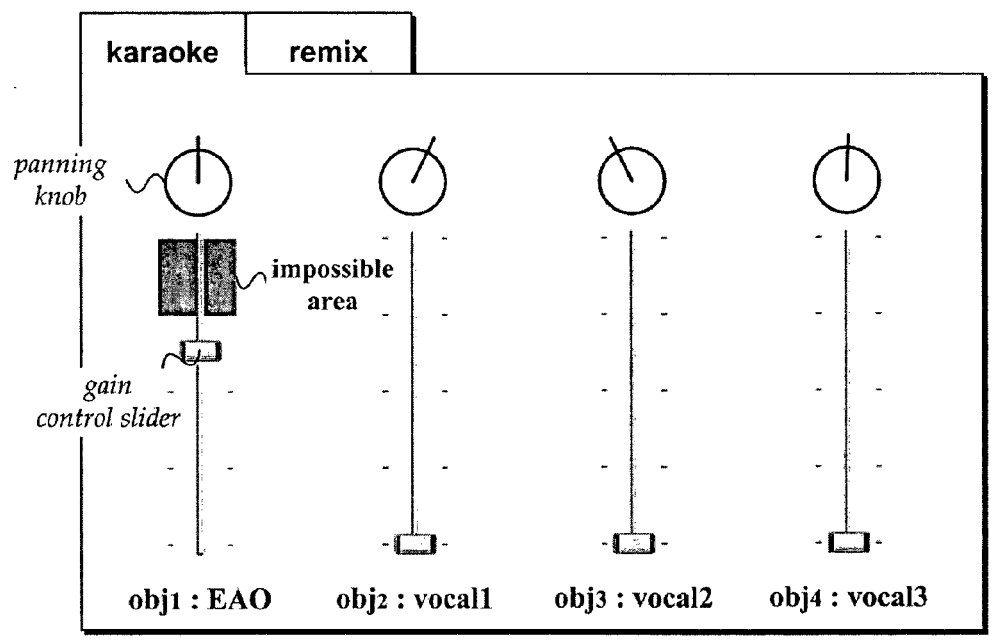
FIG. 7 is a diagram for one example of a modified control information in a screen displayed on a user interface 250 shown in FIG. 2.

FIG. 6 is a diagram for one example of screen configuration of a user interface 250 shown in FIG. 2. and, FIG. 7 is a diagram for one example of a modified control information in a screen displayed on a user interface 250 shown in FIG. 2.

Referring to FIG. 6, in case of a residual using mode (e.g., karaoke mode, solo mode) in FIG. 6 (A) or FIG. 6 (B), a separate input window (i.e., a karaoke tap) can be provided. As mentioned in the foregoing description, control information inputted via the input window of the residual using mode can be regarded as an input for selecting the residual using mode (e.g., karaoke mode or solo mode).

Referring to FIG. 6 (A), total 4 objects obj1 to obj4 exist in a separate input window for a residual using mode. And, an enhanced object obj1 (EAO) is included in the 4 objects as well as regular objects obj2 to obj4. And, gain control sliders capable of adjusting gains of the objects respectively and panning knobs capable of adjusting pannings of the objects respectively exist in the separate input window.

Meanwhile, as mentioned in the foregoing description of the control restricting unit 230A of the first embodiment, there may be a following condition. First of all, if a control restriction is performed despite the existence of an enhanced object, it is impossible to control each of regular objects. Hence, all of the objects should be controlled at a time. And, FIG. 6 (B) shows one example of a screen if such a condition exists. Although a gain and/or panning of an enhanced object is individually possible, since regular objects should be collectively adjusted at a time, there exist simultaneously-adjustable coupled gain control sliders and simultaneously-adjustable coupled panning knobs. If a user manipulates a slider belonging to the coupled gain control sliders (or a panning knob belonging to the coupled panning knobs), the coupled gain control sliders or the coupled panning knobs are entirely adjusted. In this case, it is preferable to display an image showing that the coupled gain control sliders or the coupled panning knobs are collectively shifted at a time.

FIG. 7 shows one example of a modified control information in the screen displayed on the user interface 250 shown in FIG. 2. After control information has been modified, if the modification of the control information is not displayed, a user may attempt to further raise a control degree. For instance, when a user performs a control to raise a gain of a specific object, as the corresponding control is restricted, if an audio is outputted with a gain lower than a user-specific level, the user misunderstands that the control is no sufficient and may consider raising the gain higher. Therefore, if the control inputted by a user is modified, it is preferable that the modified control information is outputted via the user interface. Likewise, in case of a residual using mode, when a control restriction is performed, the modified control information is preferably displayed on the screen.

Referring to FIG. 7, it can be observed that control information, which is modified based on control restriction information, is displayed as an impossible area. Although a user may be able to raise a gain control slider up to the impossible area, the modified control information can be represented as turning back below the impossible area. Alternatively, it is able to set the gain control slider to be raised by a user just below the impossible area. A method of displaying or representing the modified control information is non-limited by a specific scheme and screen.

Figure 8:
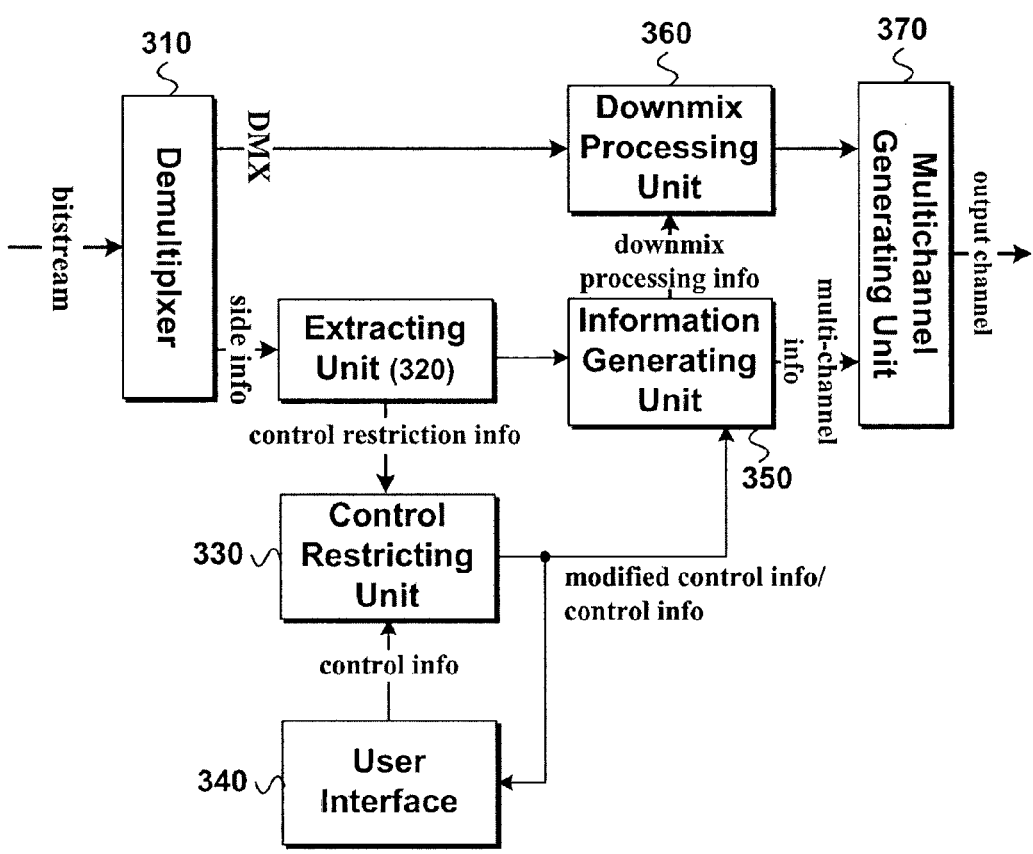
FIG. 8 is a block diagram of a configuration of a decoder in an audio signal processing apparatus according to a second embodiment of the present invention.
Figure 9:
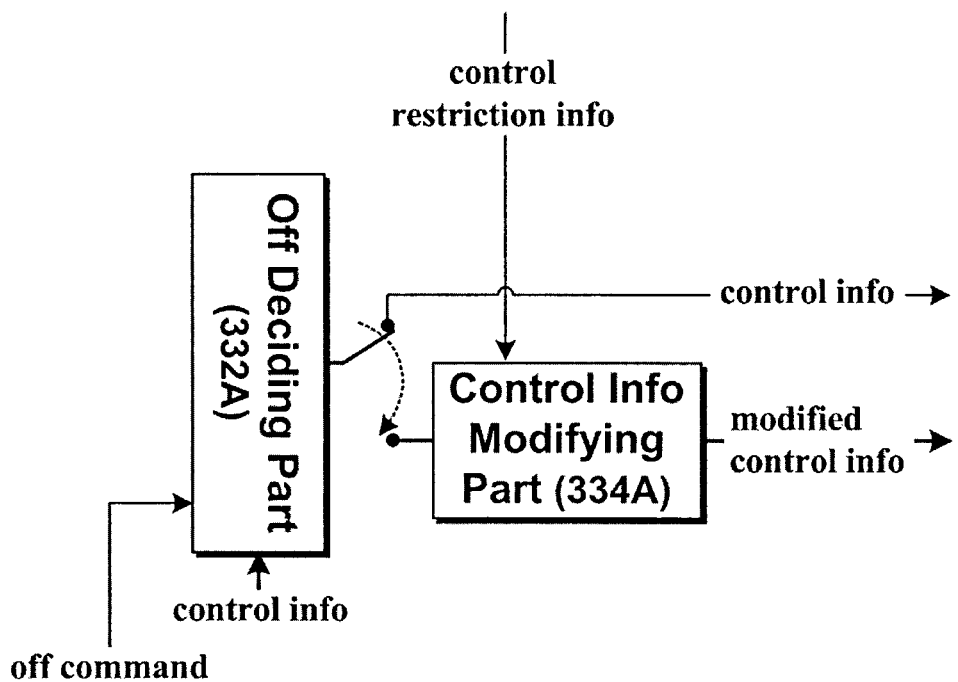
FIG. 9 is a detailed block diagram of a configuration of a control restricting unit 330 shown in FIG. 8 according to a first embodiment 330A.
Figure 10:
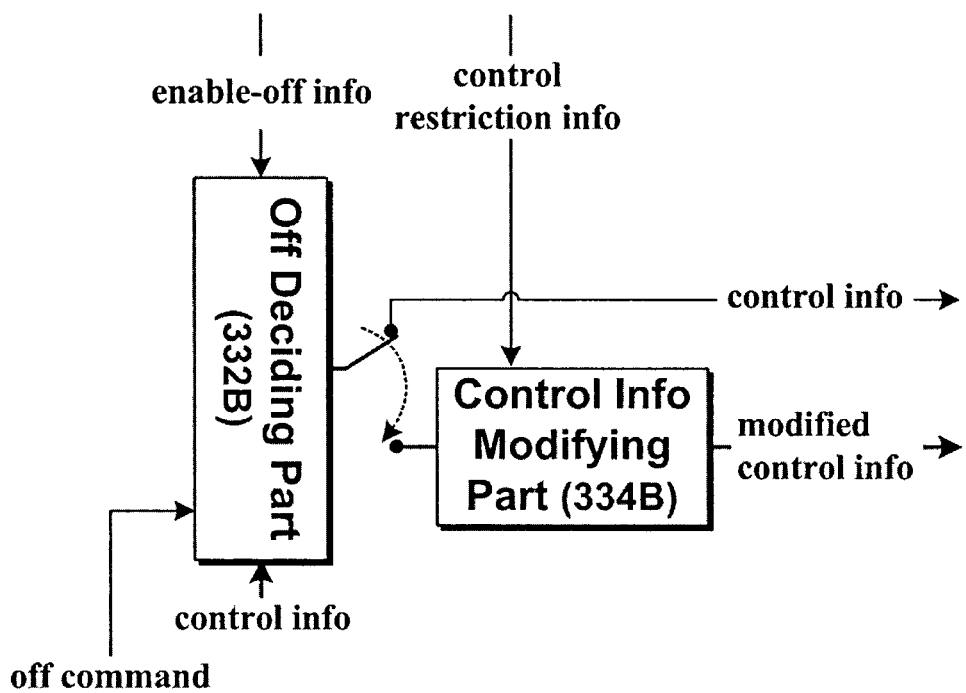
FIG. 10 is a detailed block diagram of a configuration of a control restricting unit 330 shown in FIG. 8 according to a second embodiment 330B.
Figure 11:
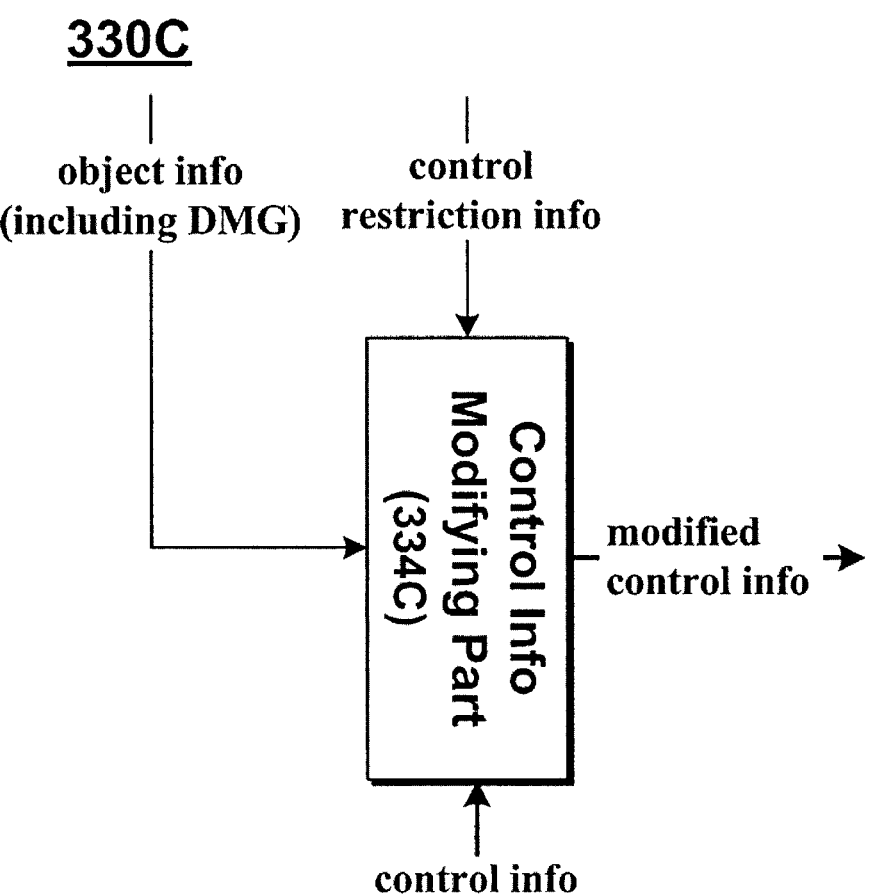
FIG. 11 is a detailed block diagram of a configuration of a control restricting unit 330 shown in FIG. 8 according to a third embodiment 330B.

FIG. 8 is a block diagram of a configuration of a decoder in an audio signal processing apparatus according to a second embodiment of the present invention. FIG. 9 is a detailed block diagram of a configuration of a control restricting unit 330 shown in FIG. 8 according to a first embodiment 330A. FIG. 10 is a detailed block diagram of a configuration of a control restricting unit 330 shown in FIG. 8 according to a second embodiment 330B. And, FIG. 11 is a detailed block diagram of a configuration of a control restricting unit 330 shown in FIG. 8 according to a third embodiment 330B. Unlike the former decoder 200 of the first embodiment, a decoder 300 according to a second embodiment includes an embodiment corresponding to a normal mode rather tan a residual using mode. Occasionally, the second embodiment may, not modify control information (per frame).

Referring to FIG. 8, a decoder 300 according to a second embodiment includes an extracting unit 320 and a control restricting unit 330 and is able to further include a demultiplexer 310, a user interface 340, an information generating unit 350, a downmix processing unit 360 and a multichannel generating unit 370. Meanwhile, both of the downmixing processing unit 360 and the multichannel generating unit 270 can be named an output channel generating unit.

Like the former demultiplexer 210 of the first embodiment, the demultiplexer 310 receives a downmix signal and side information from at least one bitstream.

The extracting unit 320 extracts object information from side information and also extracts control restriction information (for a normal mode). The object information and the control restriction information can refer to the former description with reference to FIG. 2.

The extracting unit 320 is able to further extract enable-off information from the side information. In this case, the enable-off information is the information indicating whether a use of control restriction information for a current frame is mandatory or optional, if the control restriction information exists.

The control restricting unit 330 receives the control restriction information from the extracting unit 320 and then determines whether to apply the received control restriction information to the current frame based on the enable-off information and/or a user-off command. Irrespective of a presence or non-presence of a degradation of a sound quality, if a user does not want a specific control to be restricted, although the control restriction information is included in the bitstream, the use of the control restriction information can be skipped.

If the control restricting unit 330 determines to apply the control restriction information, the control restricting unit 330 modifies the control information using the control restriction information and then outputs the modified control information. On the contrary, if the control restricting unit 330 determines not to apply the control restriction information, the control restricting unit 330 does not use the control restriction information but delivers the received control information to the information generating unit 350 as it is. The control information and the modified control information can refer to the description of the former decoder 200 of the first embodiment. Yet, the control information (and the control restriction information) of the second embodiment corresponds to control information (and control restriction information) suitable for a normal mode rather than control information (and control restriction information) suitable for a residual using mode.

Meanwhile, a third embodiment of a control restricting unit 330 is provided to propose a detailed formula in applying control restriction information rather than determining whether to apply control restriction information each frame.

Figure 12:
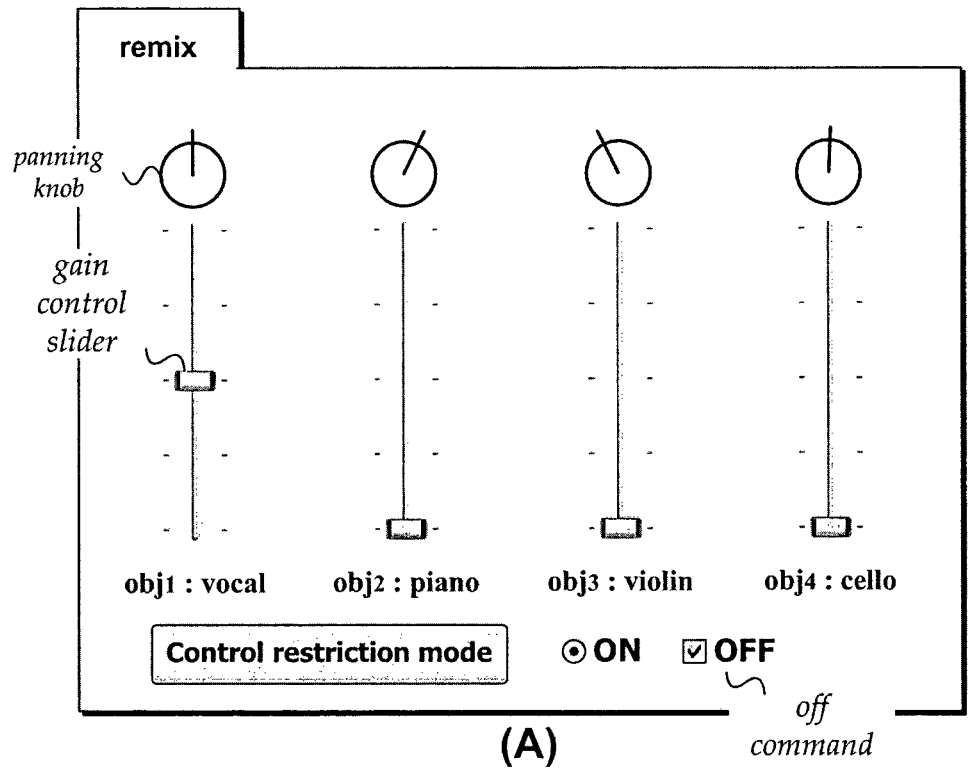
FIG. 12 is a diagram for one example of screen configuration for an input of a control restriction mode off command in a screen displayed on a user interface 340 shown in FIG. 8.
Figure 12:
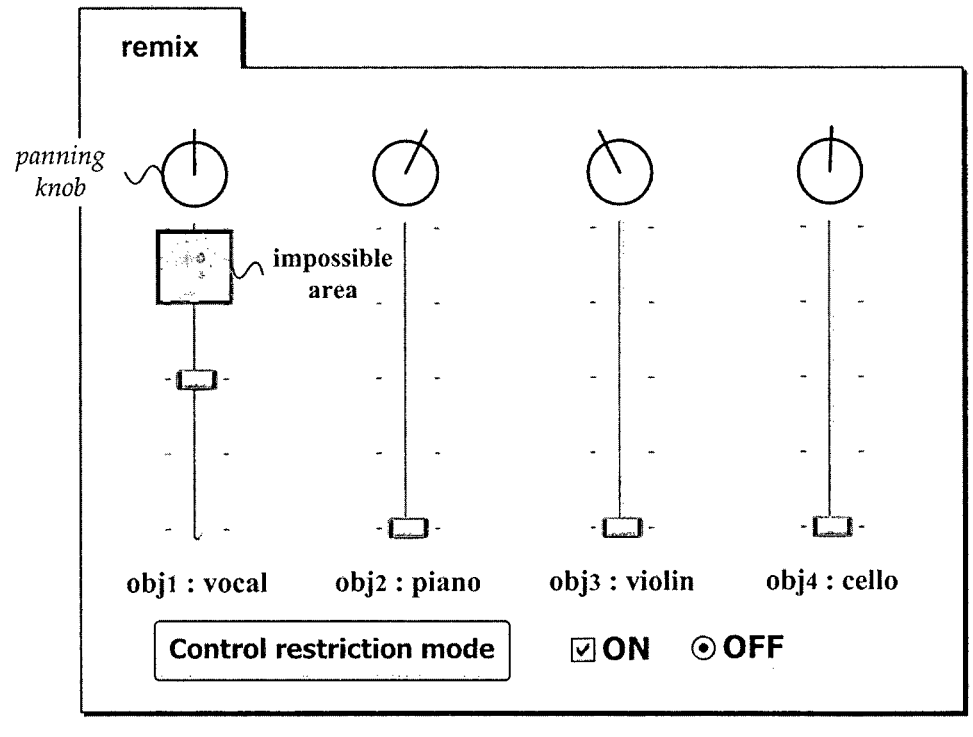
Figure 13:
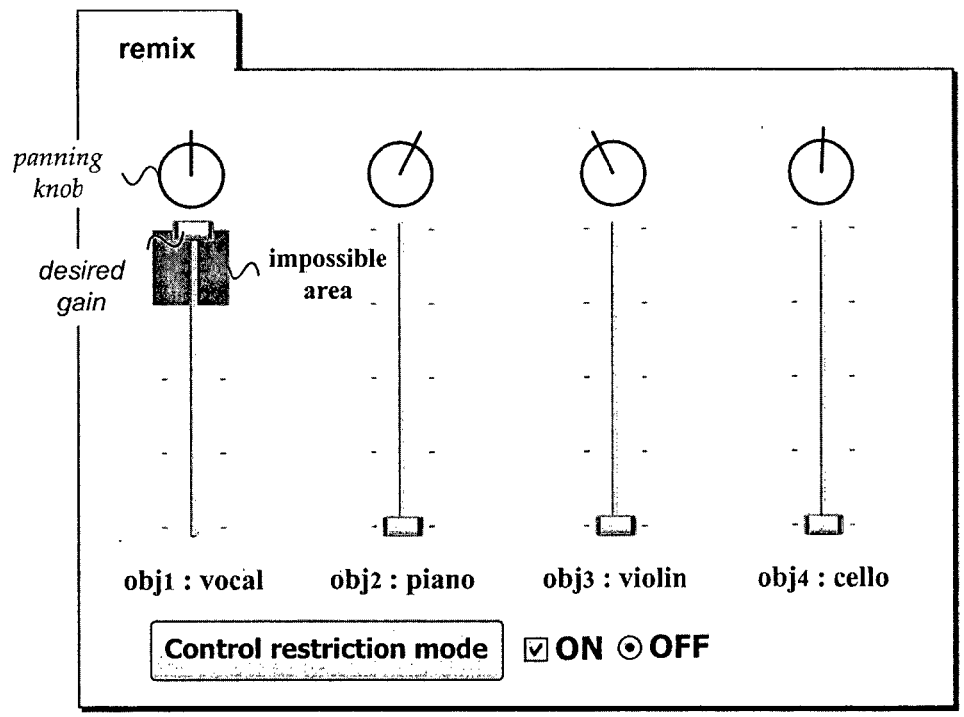
FIG. 13 is a diagram for one example of a user input screen and a modified control information displayed screen in a screen displayed on a user interface 340 shown in FIG. 8.
Figure 13:
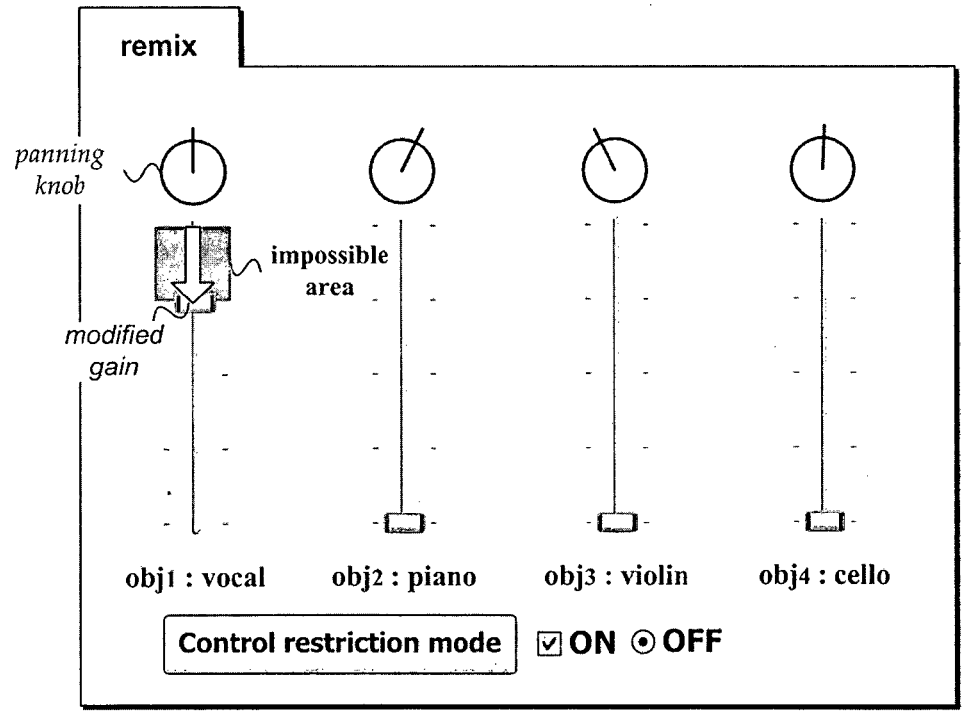

If control information is modified, the user interface 340 is able to output the modified control information. FIG. 12 is a diagram for one example of screen configuration for an input of a control restriction mode off command in a screen displayed on the user interface 340 shown in FIG. 8. FIG. 13 is a diagram for one example of a user input screen and a modified control information displayed screen in a screen displayed on the user interface 340 shown in FIG. 8. FIG. 12 shall be described together with FIG. 9 later.

Referring to FIG. 13, similar to the case shown in FIG. 7, it can be observed that the modified control information is represented as an impossible area. Even if a user-specific gain exists in an impossible area, as shown in FIG. 13 (A), it is able to adjust a gain control slider to enter the impossible area. In this case, a modified gain according to modified control information can be represented as shown in FIG. 13 (B). In particular, since the modified gain can have a maximum or minimum value except the impossible area, the gain control slider is displayed as moving to a corresponding maximum or minimum value area.

On the contrary, if a user-specific gain exists in the impossible area, it is able to display the modified control information in a manner of enabling the gain control slider not to be adjusted into the impossible area at all.

Referring now to FIG. 8, the information generating unit 350 receives the object information having received from the extracting unit 220. In this case, the object information is as good as the former description of the first embodiment 200. Afterwards, in case of receiving the control information from the control restricting unit 230 for a current frame, the information generating unit 350 generates a first downmix processing information (and a first multichannel information). In case of receiving the modified information from the control restricting unit 230 for the current frame instead of receiving the control information, the information generating unit 350 generates a second downmix processing information (and a second multichannel information). As mentioned in the foregoing description of the first embodiment 100, each of the first downmix processing information and the second downmix processing information is the information for processing the downmix signal by avoiding incrementing the number of channels. As mentioned in the foregoing description of the first embodiment 100, each of the first multichannel information and the second multichannel information is the information for generating a multichannel by upmixing the downmix signal or the processed downmix signal.

The information generating unit 350 generates the first downmix processing information and the second downmix processing information only in a decoding mode, in which a final output signal is a mono or stereo signal. The information generating unit 350 further generates the first multichannel signal and the second multichannel signal in a transcoding mode, in which a final output signal is a multichannel signal. If an input and an output are a mono downmix signal and a multichannel, respectively, the downmix processing information is not generated but the multichannel information is generated only.

The downmix processing unit 360 receives a downmix signal DMX, processes the downmix signal DMX based on the downmix processing information, and then outputs a processed downmix. In this case, the channel number of the downmix signal is equal to that of the processed downmix signal. Since the downmix processing information is used, the downmix processing unit 360 corresponds to an output in which a gain and/or panning of an object has been adjusted. In particular, in case of a stereo downmix and a multichannel output, the downmix processing unit 360 is able to perform a control of object panning by cross-term. Meanwhile, in case of a mono downmix and a multichannel output, a process for the downmix DMX bypasses the downmix processing unit 360 and the downmix DMX can be delivered to the multichannel generating unit 370 without change. Besides, in case of a mono or stereo output, the downmix processing unit 360 is able to output the processed downmix signal into a mono or stereo channel in time domain.

If a multichannel output is necessary, the multichannel generating unit 370 generates the multichannel output by applying the multichannel information (i.e., the first multichannel information or the second multichannel information) to the downmix signal DMX or the processed downmix signal.

In the following description, first to third embodiments 330A to 330C of the control restricting unit 330 are explained with reference to FIGS. 9 to 11. The first embodiment 330A relates to an embodiment for deciding whether to apply control restriction information based on an off command inputted by a user or a device setting information. The second embodiment 330B relates to an embodiment for deciding whether to apply control restriction information by further referring to enable-off information extracted from a bitstream in addition to the off command or the device setting information. And, the third embodiment 330C relates to an embodiment for proposing a detailed formula in applying control restriction information rather than deciding whether to apply the control restriction information each frame.

Referring to FIG. 9, a control restricting unit 330A according to a third embodiment includes an off deciding part 332A and a control information modifying part 334A.

The control restricting unit 330A decides whether to turn off a control restriction mode based on a user's of command or a device setting information. In this case, the control restriction mode means that a modified control information is generated to restrict control information using a control restriction information. Even if a control restriction information exists in a bitstream or a decoder is able to generate a control restriction information by itself, a user may want a control information inputted by himself not to be modified at all. For this case, the control restricting unit 330A is able to decide to turn off the control restriction mode. In particular, in case that an off command for turning off a control restriction mode is inputted by a user or a command for tuning off a control restriction mode is stored in a device setting information, it is able to decide to turn of the control restriction mode. One example of a screen for the off command is shown in FIG. 12.

Referring to FIG. 12 (A) and FIG. 12 (B), an input unit (e.g., a radio button) for an on command (ON) of a control restriction mode and an input unit (off command) for an off command (OFF) are displayed on a bottom of a screen. A user is then able to input the off command for turning off the control restriction mode for a specific audio signal via this screen. Moreover, the user is able to change the device setting information to turn off the control restriction mode for a non-specified audio signal.

Referring now to FIG. 9, if the off deciding part 332A decides to turn off the control restriction mode, it outputs the control information as it is. As mentioned in the foregoing description, the control information is delivered to the information generating unit 350 shown in FIG. 8. On the contrary, if the off deciding part 332A decides to turn on the control restriction mode, it delivers the control information to the control information modifying part 334A. Subsequently, the control information modifying part 334A generates a modified control information by putting restriction on the control information using the control restriction information. And, the modified control information is delivered to the information generating unit 350 as well. As the configuration and role of the control information modifying part 334 can be similar to those of the former control information modifying part 234A or 2348, their details shall be omitted from the following description.

Referring to FIG. 10, like the first embodiment, a control restricting unit 330B according to a second embodiment includes an off deciding part 332B and a control information modifying part 334B. Yet, the second embodiment differs from the first embodiment in that the off deciding part 332B further refers to enable-off information in deciding whether to turn off a control restriction mode. In this case, the enable-off information is the information extracted from the side information by the extracting unit 320. And, the enable-off information indicates whether a use of control restriction information for a current frame is mandatory or optional. In other words, the mandatory use of the control restriction information is related to whether a user is able to arbitrarily skip the control restriction information. Hence, the enable-off information can have the same idea of whether a control restriction mode can be turned off or whether the control restriction ode can be selectively turned off.

The enable-off information can be extracted only if the control restriction information is received via a bitstream. In this case, the enable-off information indicates whether a use of the control restriction information included in the bitstream is mandatory or not.

Therefore, if the enable-off information indicates that the use of the control restriction information (for a current frame) is mandatory, the off deciding part 332B does not turn off the control restriction mode irrespective of a user's off input. In particular, the off deciding part 332B delivers the control information to the control information modifying part 334B.

On the contrary, if the enable of information indicates that the use of the control restriction information is not mandatory but optional, the off deciding part 332B decides whether to turn off the control restriction mode according to a user's off command or a device setting information. In particular, if the off command or the device setting information intends to turn off the control restriction mode, the off deciding part 332B outputs the control information as it is. If the off command or the device setting information intends to turn on the control restriction mode, the off deciding part 332B delivers the control information to the control information modifying part 334B.

As the control information modifying part 334B outputs the modified control information in the same manner of the former control information modifying part 334B described with reference to FIG. 9, its details shall be omitted from the following description.

FIG. 11 shows a control restricting unit 330C according to a third embodiment. As mentioned in the foregoing description, the third embodiment is provided to propose a detailed formula in applying control restriction information rather than determining whether to apply control restriction information each frame.

A control information modifying part 334C receives downmix gain information DMG and control restriction information and then generates a modified control information by restricting control information based on the downmix gain information DMG and the control restriction information. In doing so, the following formula is usable.

$$M_{ren,lim}^{l,m} = (1-g_{DCU})M_{ren}^{l,m} + g_{DCU}D_{DS}^{l} \quad \text{[Formula 4]}$$

In Formula 4, $M_{ren,lim}^{l,m}$ indicates a modified control information, $M_{ren}^{l,m}$ indicates a control information, $g_{DCU}$ indicates a parameter corresponding to a control restriction information (or a parameter indicating a limiting degree), and $D_{DS}^{l}$ indicates a downmix matrix defined by a downmix gain information DMG.

Referring to Formula 4, if the parameter $g_{DCU}$ indicating the limiting degree has a lower value, the modified control information gets closer to an original control information. On the contrary, if the parameter $g_{DCU}$ indicating the limiting degree has a higher value, the modified control information gets closer to an original downmix matrix.

According to formula 4, it is able to solve the problem that the modified control information $M_{ren,lim}^{l,m}$ is generated unsuitable for a user's intention. When a user inputs control information [1, 3] to boost a second object, if the parameter $g_{DCU}$ is 1, the modified control information results in [2.8, 1.4]. If so, it may cause a problem that the second object is suppressed to the contrary. Yet, if the modified control information defined by Formula 4, it is able to avoid the above-mentioned problem and can be advantageous in that an operation amount is very small.

Meanwhile, the $g_{DCU}$ can have a value independent per object instead of being in common with every object. If so, Formula 4 can be modified into a form of applying a different $g_{DCU}$ per column corresponding to each object.

Meanwhile, in case of the implementation according to Formula 4, if Formula 4 is applied to a case that a control restriction mode is 'ON', it is not classified into a first mode or a second mode. Hence, it is unnecessary to transmit a separate bit to identify a mode.

The audio signal processing apparatus according to the present invention is available for various products to use. Theses products can be mainly grouped into a stand alone group and a portable group. A TV, a monitor, a settop box and the like can be included in the stand alone group. And, a PMP, a mobile phone, a navigation system and the like can be included in the portable group.

Figure 14:
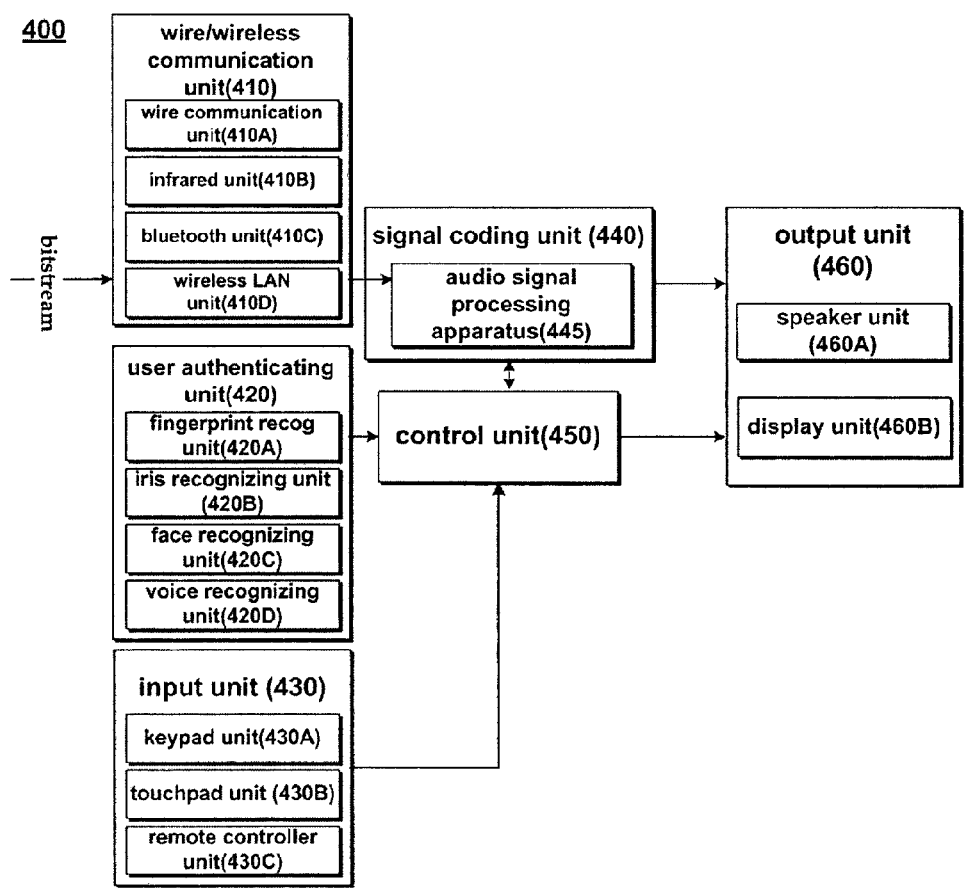
FIG. 14 is a schematic block diagram of a product in which an audio signal processing apparatus according to one embodiment of the present invention is implemented.

FIG. 14 shows relations between products, in which an audio signal processing apparatus according to an embodiment of the present invention is implemented.

Referring to FIG. 14, a wire/wireless communication unit 410 receives a bitstream via wire/wireless communication system. In particular, the wire/wireless communication unit 410 can include at least one of a wire communication unit 410A, an infrared unit 410B, a Bluetooth unit 410C and a wireless LAN unit 410D.

A user authenticating unit 420 receives an input of user information and then performs user authentication. The user authenticating unit 420 can include at least one of a fingerprint recognizing unit 420A, an iris recognizing unit 420B, a face recognizing unit 420C and a voice recognizing unit 420D. The fingerprint recognizing unit 420A, the iris recognizing unit 420B, the face recognizing unit 420C and the speech recognizing unit 420D receive fingerprint information, iris information, face contour information and voice information and then convert them into user informations, respectively. Whether each of the user informations matches pre-registered user data is determined to perform the user authentication.

An input unit 430 is an input device enabling a user to input various kinds of commands and can include at least one of a keypad unit 430A, a touchpad unit 430B and a remote controller unit 430C, by which the present invention is non-limited.

A signal coding unit 440 performs encoding or decoding on an audio signal and/or a video signal, which is received via the wire/wireless communication unit 410, and then outputs an audio signal in time domain. The signal coding unit 440 includes an audio signal processing apparatus 445. As mentioned in the foregoing description, the audio signal processing apparatus 445 corresponds to the above-described embodiment (i.e., the encoder 100 and/or the decoder 200) of the present invention. Thus, the audio signal processing apparatus 445 and the signal coding unit including the same can be implemented by at least one or more processors.

A control unit 450 receives input signals from input devices and controls all processes of the signal decoding unit 440 and an output unit 460. In particular, the output unit 460 is a component configured to output an output signal generated by the signal decoding unit 440 and the like and can include a speaker unit 460A and a display unit 460B. If the output signal is an audio signal, it is outputted to a speaker. If the output signal is a video signal, it is outputted via a display.

Figure 15:
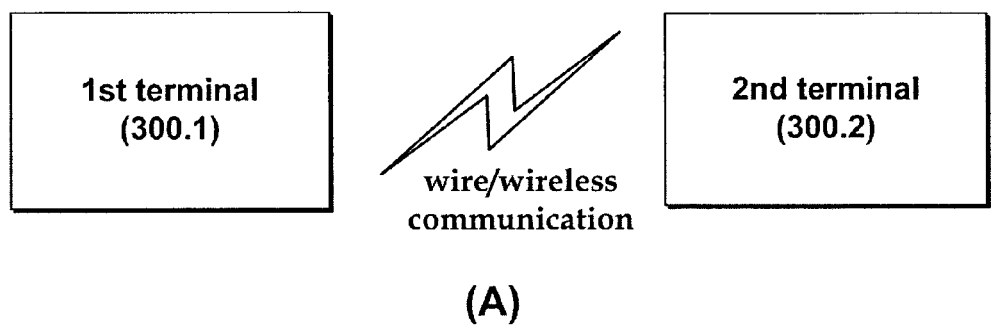
FIG. 15 is a diagram for explaining relations between products in which an audio signal processing apparatus according to one embodiment of the present invention is implemented.
Figure 15:
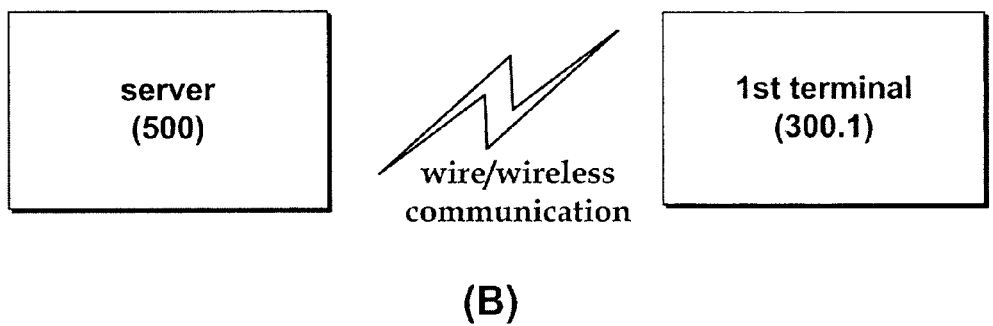

FIG. 15 is a diagram for relations of products provided with an audio signal processing apparatus according to one embodiment of the present invention. FIG. 15 shows the relation between a terminal and server corresponding to the products shown in FIG. 14.

Referring to FIG. 15 (A), it can be observed that a first terminal 400.1 and a second terminal 400.2 can exchange data or bitstreams bi-directionally with each other via the wire/wireless communication units. Referring to FIG. 15 (B), it can be observed that a server 500 and a first terminal 500.1 can perform wire/wireless communication with each other.

An audio signal processing method according to the present invention can be implemented into a computer-executable program and can be stored in a computer-readable recording medium. And, multimedia data having a data structure of the present invention can be stored in the computer-readable recording medium. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). And, a bitstream generated by the above mentioned encoding method can be stored in the computer-readable recording medium or can be transmitted via wire/wireless communication network.

INDUSTRIAL APPLICABILITY

Accordingly, the present invention is applicable to process and output an audio signal.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A method for processing an audio signal, comprising:
  receiving a downmix signal and side information;
  extracting downmix gain information, control restriction information and off-enable information from the side information, wherein the downmix gain information indicates a gain applied to each object when the each object is downmixed;
  receiving control information for controlling gain or panning at least one object signal;
  generating downmix matrix using the downmix gain information;
  generating at least one of first multi-channel information and first downmix processing information based on at least of the off-enable information, the control information, object information, the control restriction information and the downmix matrix; and
  generating an output signal by applying the at least one of the first multichannel information and the first downmix processing information to the downmix signal,
  wherein the control restriction information relates to a parameter indicating limiting degree of the control information,
  wherein the off-enable information indicates whether the control restriction information must be used or may be used selectively.

2. The method of claim 1, wherein, when the off-enable information indicates that the control restriction information may be used selectively, the first multi-channel information and the first downmix processing information are generated, without using the control restriction information.

3. The method of claim 1, wherein, when the off-enable information indicates that the control restriction information must be used, estimating modified control information based on the control information and the control restriction information.

4. The method of claim 3, further comprising:
  generating at least one of second multichannel information and second downmix processing information based on the modified control information, object information and the control restriction information.

5. The method of claim 4, wherein, when the output signal corresponds to multichannel signal, the second multichannel information is generated,
  when the output signal corresponds to mono signal or stereo signal, the second multichannel information is not generated.

6. The method of claim 1, wherein, when the output signal corresponds to multichannel signal, the first multichannel information is generated,
  when the output signal corresponds to mono signal or stereo signal, the first multichannel information is not generated.

7. An apparatus for processing an audio signal, comprising:
  a demultiplexer receiving a downmix signal and side information;
  an extracting unit extracting downmix gain information, control restriction information and off-enable information from the side information, wherein the downmix gain information indicates a gain applied to each object when the each object is downmixed;
  a control restricting unit receiving control information for controlling gain or panning at least one object signal;
  an information generating downmix matrix using the downmix gain information and generating at least one of first multi-channel information and first downmix processing information based on at least of the off-enable information, the control information, object information, the control restriction information and the downmix matrix; and,
  an output channel generating unit generating an output signal by applying the at least one of the first multi-channel information and the first downmix processing information to the downmix signal,
  wherein the control restriction information relates to a parameter indicating limiting degree of the control information, and
  wherein the off-enable information indicates whether the control restriction information must be used or may be used selectively.

8. The apparatus of claim 7, wherein, when the off-enable information indicates that the control restriction information may be used selectively, the first multi-channel information and the first downmix processing information are generated, without using the control restriction information.

9. The apparatus of claim 7, wherein, when the off-enable information indicates that the control restriction information must be used, the control restricting unit estimates modified control information based on the control information and the control restriction information.

10. The apparatus of claim 9, wherein the information generating unit generates at least one of second multichannel information and second downmix processing information based on the modified control information, object information and the control restriction information.

11. The apparatus of claim 10, wherein, when the output signal corresponds to multichannel signal, the second multichannel information is generated,
  when the output signal corresponds to mono signal or stereo signal, the second multichannel information is not generated.

12. The apparatus of claim 7, wherein, when the output signal corresponds to multichannel signal, the first multichannel information is generated,
  when the output signal corresponds to mono signal or stereo signal, the first multichannel information is not generated.

* * * * *